(12) United States Patent
Ziegs

(10) Patent No.: US 6,814,192 B2
(45) Date of Patent: Nov. 9, 2004

(54) DEVICE FOR BRAKING A MOTOR SHAFT

(75) Inventor: Carsten Ziegs, Hamburg (DE)

(73) Assignee: Dolmar GmbH, Hamburg (DE)

( * ) Notice: Subject to any disclaimer, the term of this patent is extended or adjusted under 35 U.S.C. 154(b) by 0 days.

(21) Appl. No.: 10/068,469

(22) Filed: Feb. 6, 2002

(65) Prior Publication Data

US 2002/0121411 A1 Sep. 5, 2002

(30) Foreign Application Priority Data

Jul. 7, 2001 (DE) .................................... 201 02 076 U

(51) Int. Cl.⁷ ............................................. B60T 13/04
(52) U.S. Cl. .................. 188/166; 188/77 R; 188/77 W; 30/381
(58) Field of Search ............................. 188/336, 77 W, 188/77 R, 216, 166; 192/80, 17 R; 30/380, 381, 382; 108/82.6

(56) References Cited

U.S. PATENT DOCUMENTS

| | | | | | |
|---|---|---|---|---|---|
| 3,776,331 A | * | 12/1973 | Gustafsson | ................ | 188/77 R |
| 3,937,306 A | * | 2/1976 | Naslund et al. | ............ | 188/77 R |
| 4,456,100 A | * | 6/1984 | Manaki | ..................... | 188/77 R |
| 5,314,044 A | * | 5/1994 | Sharp | ........................ | 188/77 R |
| 6,112,863 A | * | 9/2000 | Colletti | ..................... | 188/77 R |
| 6,152,089 A | * | 11/2000 | Neumann et al. | .......... | 123/41.7 |

* cited by examiner

Primary Examiner—Matthew C. Graham
Assistant Examiner—Mariano Sy
(74) Attorney, Agent, or Firm—Nash and Titus, LLC

(57) ABSTRACT

The invention relates to a device for braking a motor shaft, such as a motor shaft of a chain saw, with a brake band that at least partially surrounds an area of the shaft and with at least one guide component that cooperates with the brake band and holds it in its axial position. The brake band comprises at least one projection formed in one piece with the brake band.

9 Claims, 5 Drawing Sheets

DEVICE FOR BRAKING A MOTOR SHAFT

FIELD OF THE INVENTION

This application claims priority from German application FRG 201 02 076.9, filed Feb. 7, 2001, and the contents of this German application are incorporated herein by reference in their entirety.

The present invention relates to a device for braking a motor shaft, especially for a motor shaft in a chain saw, with a brake band that at least partially surrounds an area of the shaft.

BACKGROUND OF THE INVENTION

In implements comprising rotating masses a rapid braking of these masses is often desired. For example, a drum brake consisting of brake band and coupling (or clutch) drum are used to brake a chain in a chain saw. The brake bands are asymmetrically designed in this instance for an optimum utilization of material, relative to the forces occurring during braking. Furthermore, the deep-drawn coupling drums have a conicity of their outer circumference, which results in an axial force, in the interplay with the asymmetry of the braking and during the braking process, that can allow the brake band to slip off the coupling drum.

In order to secure the brake band from slipping off axially during the engagement of the brake, e.g., the area around the coupling drum is very tightly closed by an additional housing covering so that the brake band is axially secured in the braking state. A very precise positioning of the parts to each other is necessary in order to assure such a securing. In addition, a brake band heated by the braking process can damage or melt plastic coverings upon making contact with them.

In other known solutions tongues (or flaps) are welded onto the brake band that are guided in radial offsets (relative to the axis of rotation of the coupling shaft) of the component guiding the brake band, e.g., a crankcase. This means additional components, sources of errors in the production and therefore increased production costs.

SUMMARY OF THE INVENTION

The invention therefore addresses the basic problem of providing a device for braking a motor shaft with a brake band which device makes possible an exact guidance of the brake band without additional, separate components on the brake band and the surrounding housing.

The invention solves this problem in that the brake band comprises at least one projection designed in one piece with the brake band. It is possible, due to the features of the invention, that an exact guidance of the brake band is assured without additional components on the brake band or the housing, which eliminates additional costs for components that hold the brake band in position.

DETAILED DESCRIPTION OF THE PREFERRED EMBODIMENTS

Figure 1:
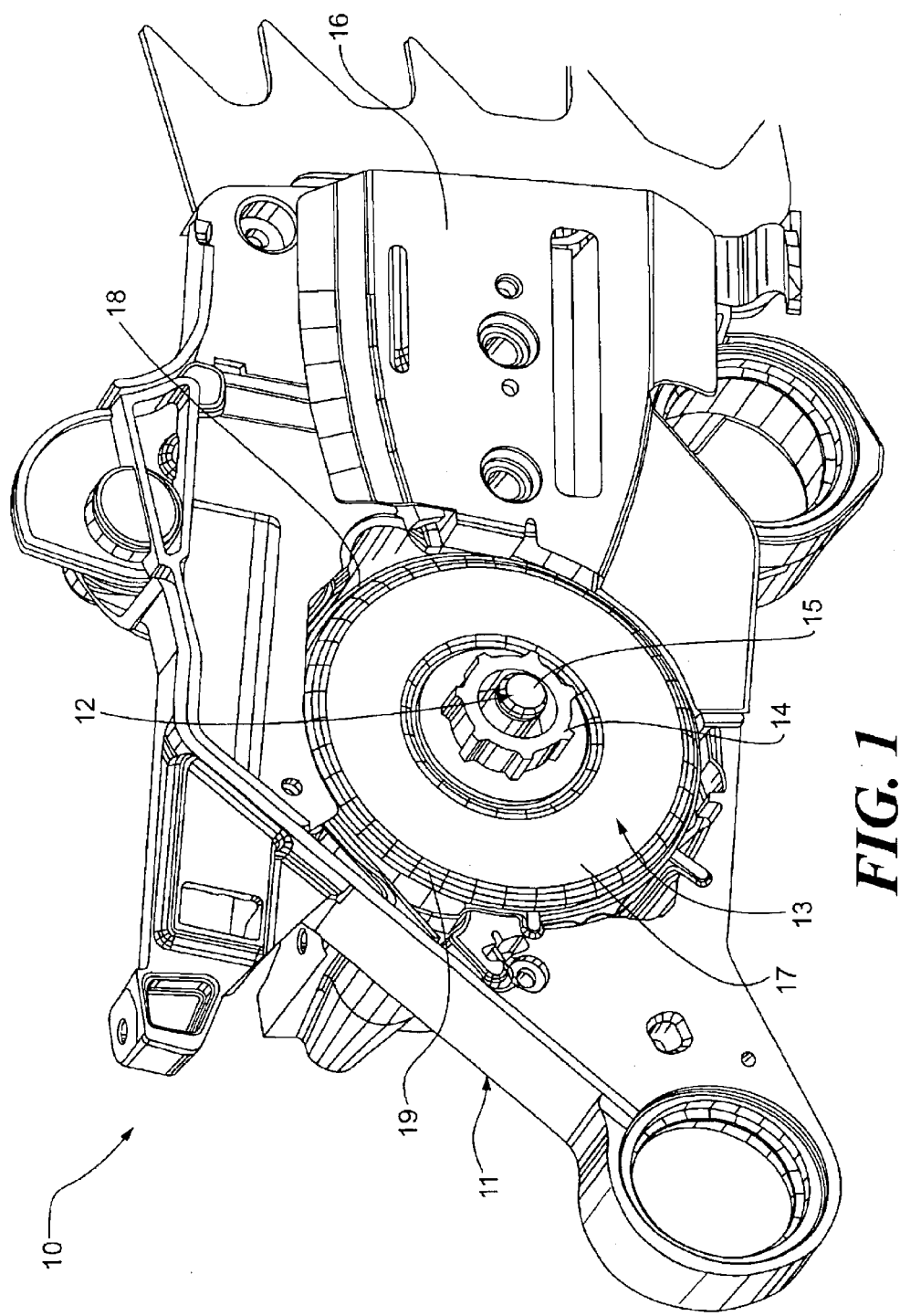
FIG. 1 shows a perspective side view of a chain saw with motor shaft in accordance with the present invention.

According to a preferred embodiment of the invention the at least one projection is designed as a bulge (or convexity) of the brake band in order to achieved a simplified manufacture of the brake band.

According to an especially advantageous embodiment of the invention the outside diameter of the projection is greater than the sum of the outside diameter of a loop formed by the brake band plus the radial work path of the loop in order to assure that the brake band is securely guided in its initial position as well as in the position during the braking procedure.

The guide component that holds the brake band in its axial position is preferably located on a housing.

According to an advantageous embodiment this guide component is designed in one piece with the housing in order to use already-present elements of the housing for guiding and to make a simplified method of manufacture possible and save assembly work.

According to a preferred embodiment of the invention the housing comprises radial recesses for receiving the projections. The projection is preferably formed thereby by two guide components that are preferably a part of the housing in order to reduce manufacturing costs.

According to a special embodiment of the invention the recesses are formed in the housing by counterdipping (that is, dipping opposite) in the die-casting tool in order to make possible a simple, economical mass production.

Exemplary embodiments of the invention are explained below with reference made to the drawings, which embodiments are described using a chain saw as an example.

A device for braking a motor shaft in a chain saw 10 is described with reference made to FIG. 1. Crankcase 11 is shown in which motor shaft 12 is supported and driven by a motor (not shown). Motor shaft 12 is coupled by coupling apparatus (or clutch) 13 to gear 14 that rotates about the same axis of rotation 15 as motor shaft 12. The gear serves to drive the chain (not shown) of chain saw 10.

In addition, chain guide sheet 16 is attached to crankcase 11 and assures the guidance of the chain to gear 14. The coupling comprises circular coupling drum 17 rigidly connected to gear 14 for a rotary movement about axis 15. Furthermore, circularly arranged brake band 18 lies around coupling drum 17 and is anchored on one side in crankcase 11. In order to brake the movement of the chain the rotation of coupling drum 17 is braked. To this end a tractive force is exerted on one end of brake band 18 in order to reduce the diameter of circularly arranged brake band 18. As a result thereof, brake band 18 engages with the periphery of coupling drum 17 and exerts a frictional force on drum 17 in order to brake its rotation. The periphery of the drum has a conical surface 19 on which brake band 18 comes to rest during the braking process. An exact guidance of brake band 18 is necessary in order to unambiguously position the band when the brake is not in use and in order to prevent brake band 18 from slipping off from coupling drum 17 during the braking process.

Figure 2:
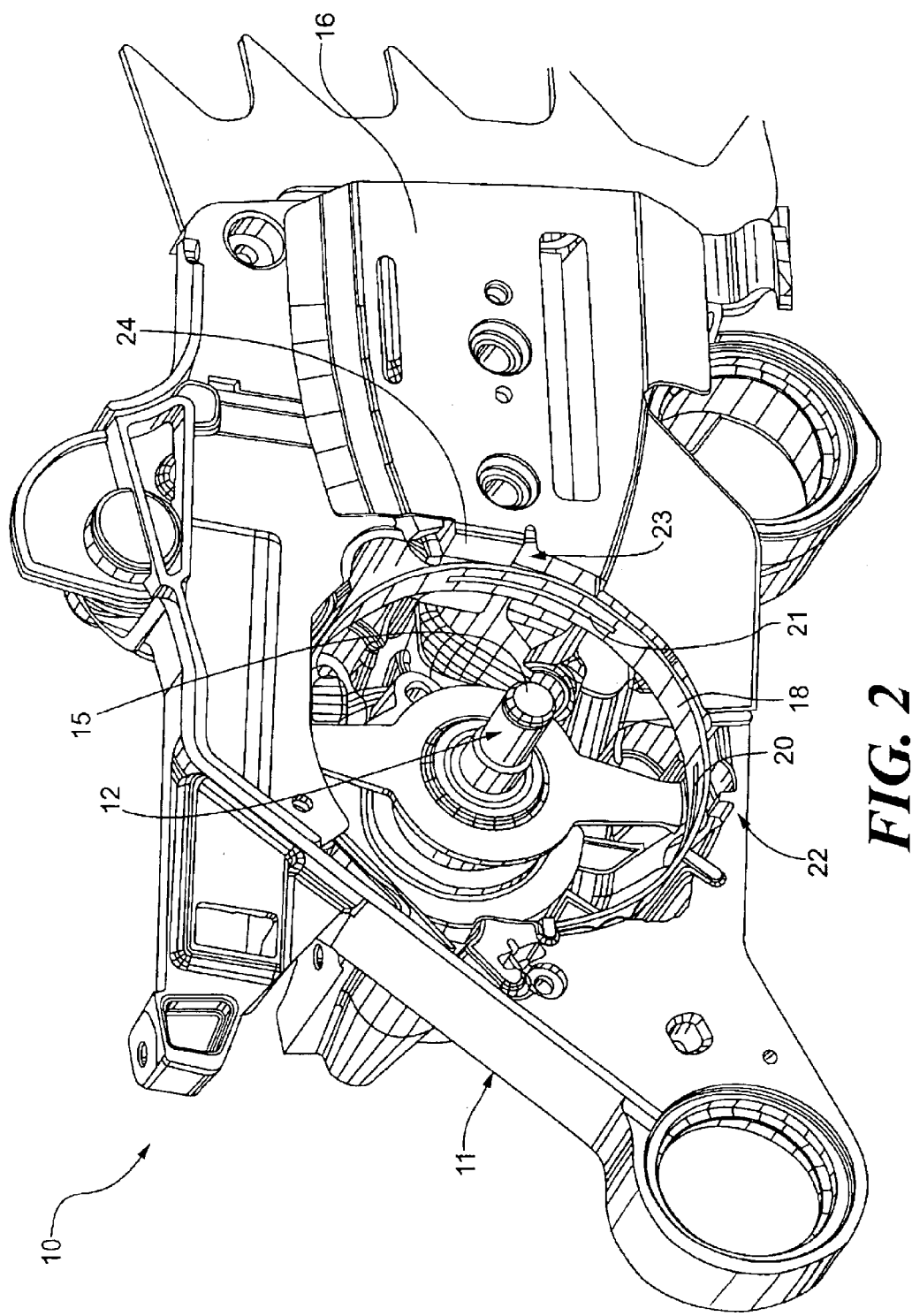
FIG. 2 shows a view of FIG. 1 in which the coupling drum has been removed.

FIG. 2 shows crankcase 11 of FIG. 1; however, coupling drum 17 has been removed here along with the gear and the coupling in order to show the positioning of brake band 18. The support and guidance of brake band 18 is assured by at least one projection, in the present instance two projections 20, 21 located on brake band 18. Projections 20, 21 engage with guide components 22, 23 located on crankcase 11 and on the end of chain guidance sheet 24 facing the motor shaft.

Figure 3:
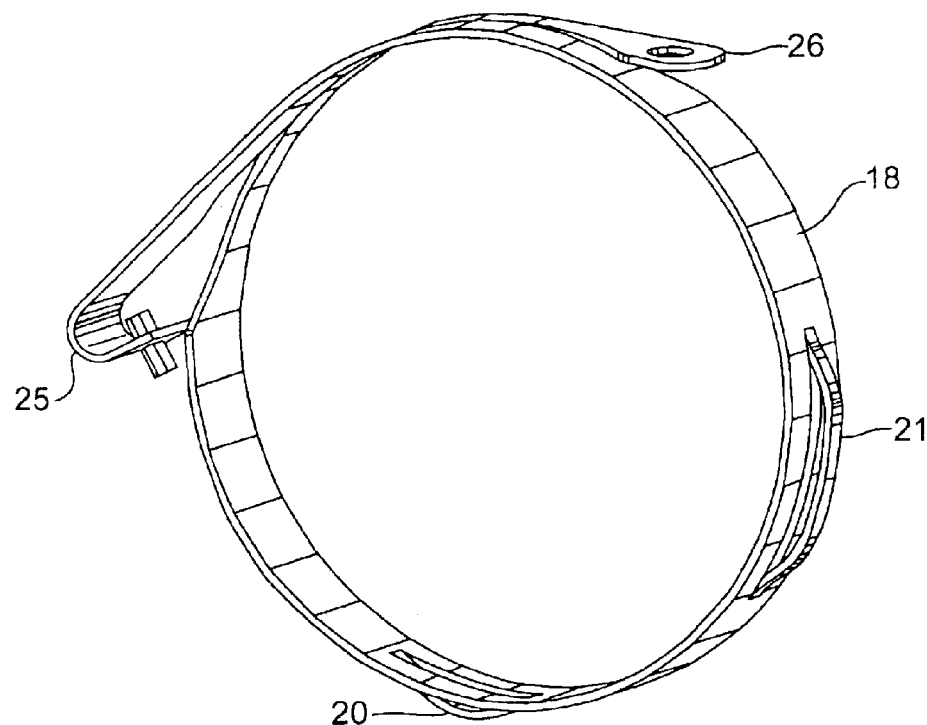
FIG. 3 shows a perspective view of a brake band in accordance with the invention.
Figure 4:
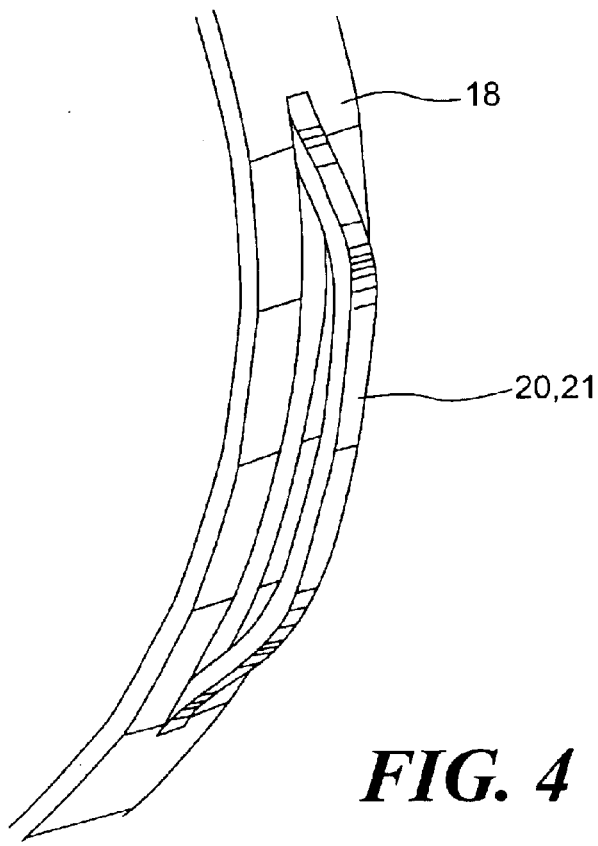
FIG. 4 shows a detail view of brake band of the invention according to FIG. 3.

Brake band 18 will first be described with reference made to FIGS. 3, 4. Brake band 18 comprises a first end 25 and a second end 26. First end 25 is fastened to crankcase 11 (see FIG. 2) and second end 26 is movably arranged in crankcase 11. As previously stated, brake band 18 forms a circular loop surrounding coupling drum 17 in the assembled state. Upon an appropriate movement of second end 26 the diameter of the circular loop becomes smaller, as a result of which brake band 18 comes to contact coupling drum 17.

Brake band 18 has two projections 20, 21 for guiding brake band 18 that are in one piece with brake band 18. In the preferred exemplary embodiment of the invention projections 20, 21 are realized in the form of bulges of brake band 18. Projections 20, 21 are manufactured by deformation processes such as, e.g., stamping or impressing on brake band 18. In particular, projections 20. 21 can be stamped as symmetric partial supports (e.g., rim holes or eyelets). The outside diameter of the projections is greater than the sum of the outside diameter of the loop formed by mounted brake band 18 plus the radial work path of brake band 18. This assures that projections 20, 21 do not come out of engagement during the braking process with guide components 22, 23 described relating to the later figures. The guiding and holding of brake band 18 in its initial position as well as during the braking process is given therewith. Projections 20, 21 extend radially outward in relation to the axis of rotation of the motor shaft.

Figure 5:
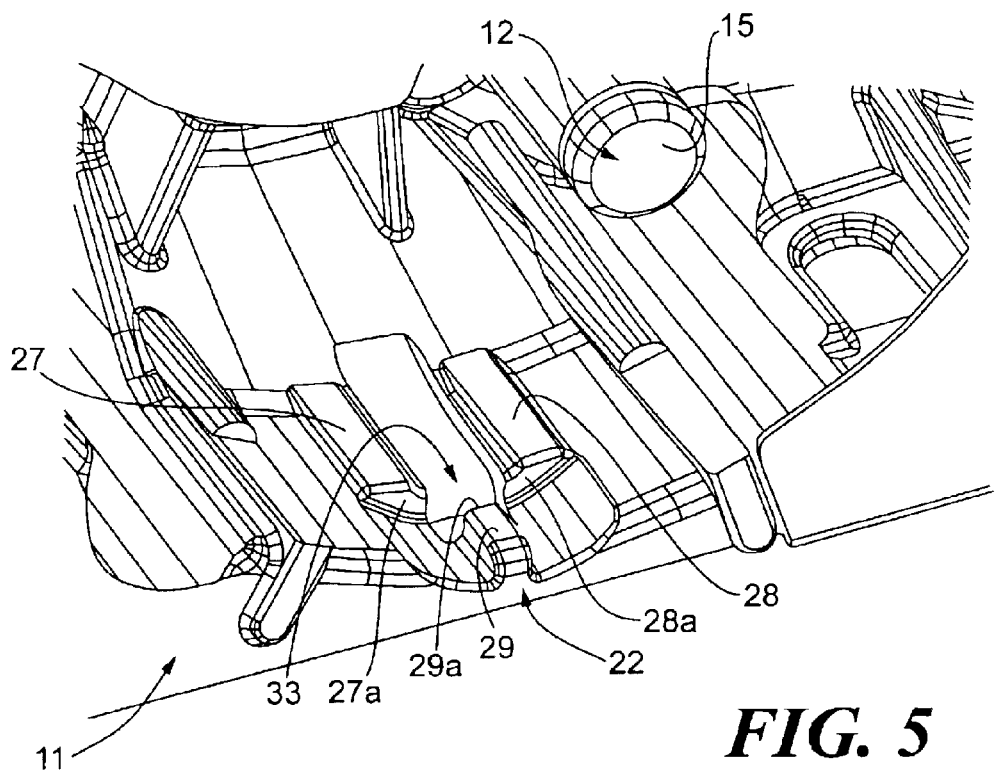
FIG. 5 shows a detail view of FIG. 2 without brake band.

FIG. 5 shows a detail view of the lower brake band insert area in crankcase 11 of FIG. 2. The brake band has been removed from the drawing. At least one of the guide components 22 is designed as recess 26 in the inner wall of the crankcase. Recess 33 can be formed in the inner wall by subsequent mechanical working or also without subsequent working by counter-dipping (dipping opposite) in the die-casting tool. The recess is defined by three guide parts 27, 28, 29 comprising lateral surfaces 27a, 28a, 29a arranged normally to axis of rotation 15.

Figure 6:
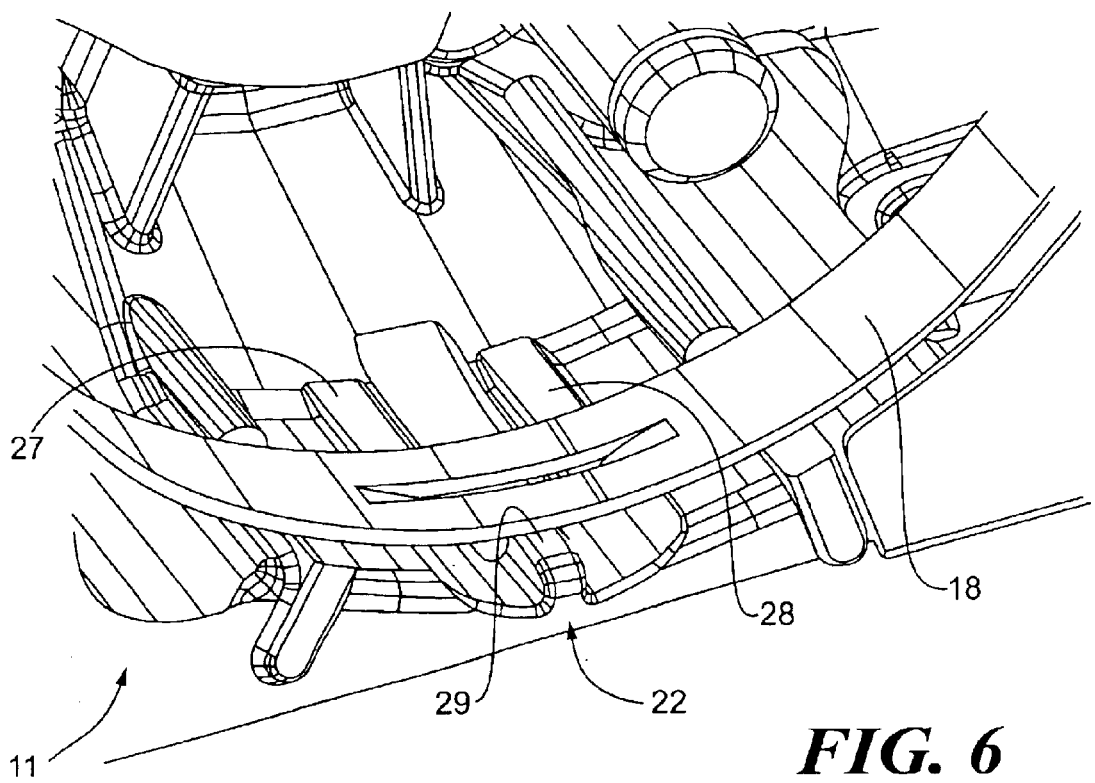
FIG. 6 shows the detail view of FIG. 5 with inserted brake band.

In FIG. 6 recess 33 is designed in such a manner that it can receive projections 20, 21 of brake band 18, during which lateral surfaces 27a, 28a, 29a engage with projections 20, 21 in order to guide brake band 18 in its radial movement from the initial position into the position during the braking process. An unintended axial slipping of brake band 18 is thus prevented by an embedment or inclusion of projections 20, 21 of the brake band in recess 33. The dimensions of projections 20, 21 are selected so that even in the braking position projections 20, 21 remain embedded or included in recess 33.

Figure 7:
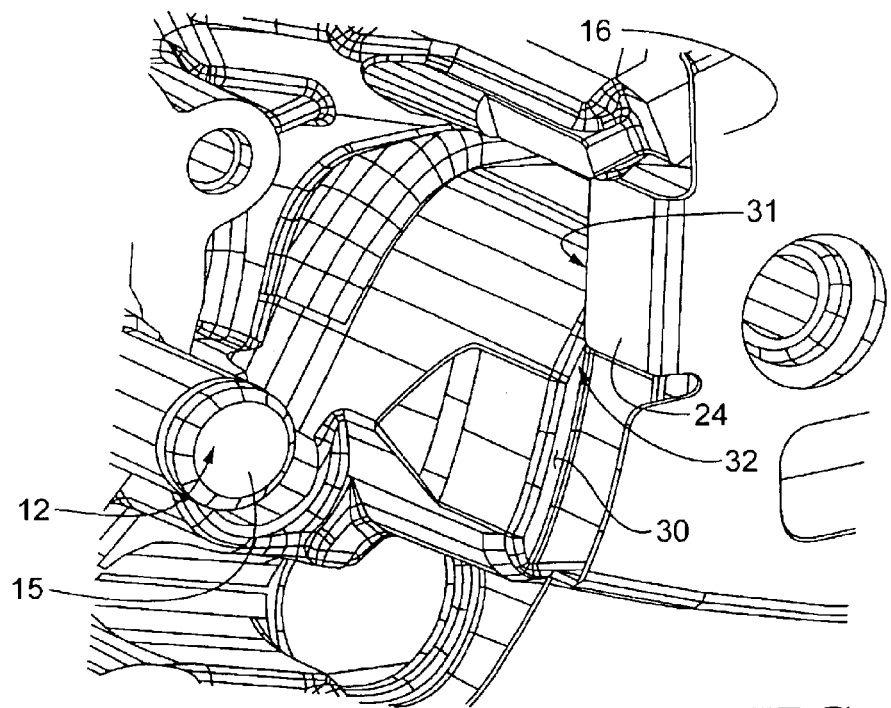
FIG. 7 shows another detail view of FIG. 2 without brake band.
Figure 8:
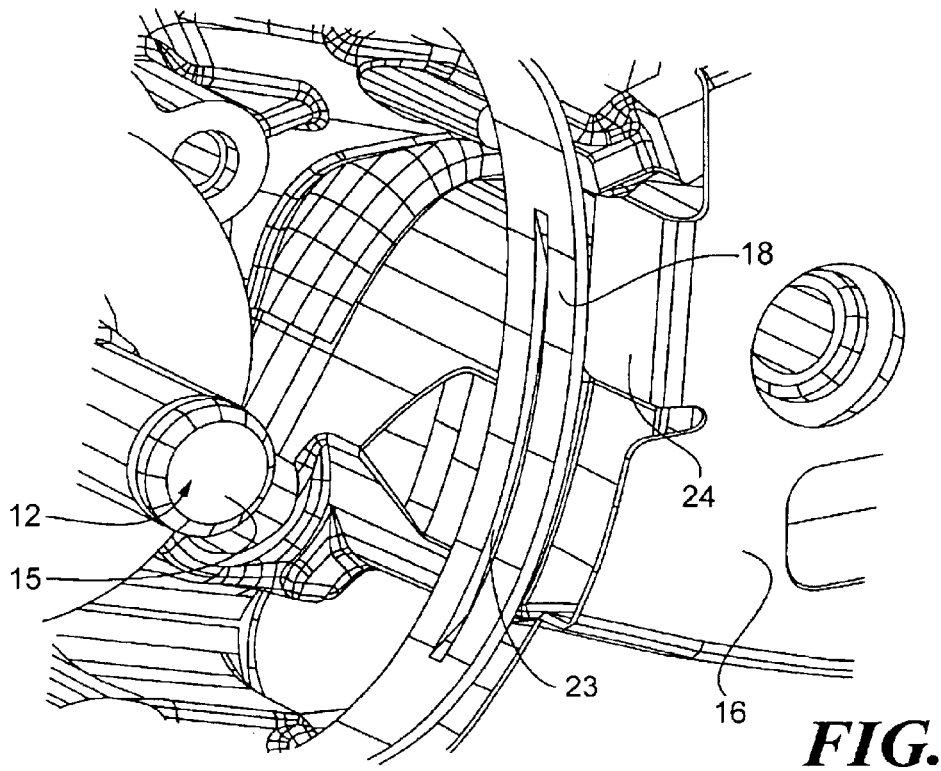
FIG. 8 shows the detail view of FIG. 7 with inserted brake band.

FIGS. 7 and 8 show another detail view of crankcase 11 and comprise another guidance, in accordance with the invention, of brake band 18. A contact surface 30 of crankcase 11 defines together with zone of contact 31 of the chain guide sheet a guidance recess or a guidance conduit. A projection 20, 21 of brake band 18 is received in this guidance conduit 32 and guides brake band 18 in its movement and prevents an axial slipping of brake band 18 in the initial position and in the braking position.

Even though the device was described using a chainsaw 10, a device designed in accordance with the invention can also be used in other implements and machines in which a motor shaft is braked by a brake band without departing from the concept of the invention.

What is claimed is:

1. A chain saw in combination with a device for braking a motor shaft within the chain saw, said device comprising a brake band that at least partially surrounds an area of the motor shaft, and at least one guide component that cooperates with the brake band and holds the brake band in its axial position, wherein the brake band comprises at least one projection formed as one piece with the brake band, said at least one guide component comprising a recess for receiving the at least one projection, said recess comprising lateral surfaces for engaging with the at least one projection.

2. The device of claim 1, wherein the at least one projection is a bulge of the brake band.

3. The device of claim 1, wherein the brake band is in the form of a loop having a radial work path, and wherein the at least one projection comprises an outside diameter, and wherein the outside diameter of the at least one projection is greater than the sum of the outside diameter of the loop plus the radial work path of the loop.

4. The device of claim 1, wherein the guide component is attached to the housing.

5. The device of claim 1, wherein the guide component is formed in one piece with the housing.

6. The device of claim 1, wherein the housing comprises at least one radial recess for receiving the projections.

7. The device of claim 6, wherein the recess is formed by two guide components.

8. The device of claim 6, wherein the recess is formed in the housing by counterdipping in a die-casting tool.

9. The device according to claim 1, wherein the motor shaft is contained within a housing on the chain saw.

* * * * *